A. F. HALL.
PISTON PACKING.
APPLICATION FILED NOV. 22, 1920.

1,418,918.  Patented June 6, 1922.

Inventor
Andrew F. Hall
by Roberts, Roberts & Cushman
his Attorneys.

UNITED STATES PATENT OFFICE.

ANDREW F. HALL, OF WEST SOMERVILLE, MASSACHUSETTS, ASSIGNOR TO PRESSURE PROOF PISTON RING COMPANY, OF BOSTON, MASSACHUSETTS, A CORPORATION OF MASSACHUSETTS.

PISTON PACKING.

1,418,918.   Specification of Letters Patent.   Patented June 6, 1922.

Application filed November 22, 1920. Serial No. 425,608.

*To all whom it may concern:*

Be it known that I, ANDREW F. HALL, a citizen of the United States of America, and resident of West Somerville, in the county of Middlesex and State of Massachusetts, have invented new and useful Improvements in Piston Packing, of which the following is a specification.

This invention relates to piston rings, and particularly to metallic packing rings adapted for use upon the pistons of internal combustion engines.

Engines of this type operate at high piston speed, and as the piston stroke is comparatively short, the reversal of direction of motion of the piston occurs with great rapidity.

Rings now in general use in such engines are expected to be kept in close contact with the cylinder wall and with at least one side of the piston groove. The simple form of one piece split ring is intended to fill the piston groove laterally, but owing to the necessary tolerances of manufacture and the differences in the coefficients of expansion of the materials of the ring and piston, there is usually a small clearance between the ring and the side wall of the groove. In composite rings, made up of one or more bearing rings and an expander or follower ring, there is usually a greater clearance between the side of the ring and the side of the groove, inherent in the very design.

Such clearances, whether large or small, permit the rings to reciprocate in the grooves at the time of the rapid reversal of motion of the piston. The separation of the side of the ring from the side of the groove obviously destroys the tight seal between the ring and piston, permits the leakage of gas and oil, and reduces the efficiency of the engine. In composite rings employing a spring follower ring, the latter tends to some extent to counteract the reciprocation of the contact ring in the groove, but the motion of the piston is so exceedingly rapid that the spring follower ring will not wholly prevent the separation of the side of the contact ring from the side of the groove, nor close it up again when separated quickly enough to prevent leakage.

Broadly defined the invention consists in providing piston packing rings with cup-like depressions adapted to cause the rings to adhere to one of the side walls of the groove by suction or vacuum action.

I have illustrated in the accompanying drawings the application of the invention to several different forms of rings, but this is by way of illustration and not of limitation, and it will be understood that the invention may be applied to other types of rings provided they have lateral surfaces adapted to contact with the side walls of the grooves.

In the drawings:—

Figure 1:
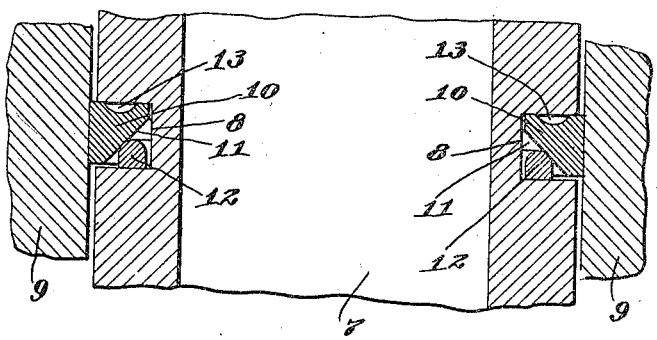
Fig. 1 is a fragmentary section showing my invention applied to a two part ring in place upon piston.
Figure 5:
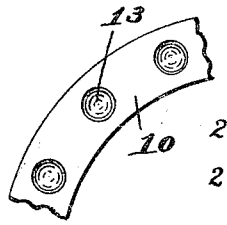
Fig. 5 is a fragmentary plan view of the form of rings shown in Figs. 1 and 2.

Referring to Fig. 1, the piston 7 is provided with the usual groove 8 to receive the piston ring which bears against the cylinder wall 9. The composite packing comprises the bearing ring 10 which is provided with a bevel 11 upon its back, and the spring expander or follower ring 12 which bears against this beveled portion. The upper surface of the ring 10 is provided with a plurality of cup-like depressions 13 as shown in Figs. 1 and 5.

Figure 2:
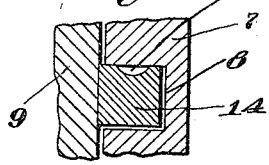
Fig. 2 is a fragmentary section showing the invention applied to a simple snap ring.

In Fig. 2 a split snap ring 14 of usual form has been shown, having the usual rectangular cross section, and provided with the cup shaped depressions 13 upon its axial surface.

Figure 3:
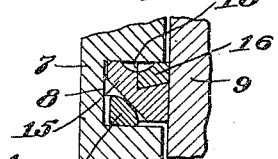
Fig. 3 is a fragmentary section showing one form of my invention applied to a three part ring.

In Fig. 3 is shown a three part ring comprising the bearing ring 15, breaker ring 16, and spring expander or follower ring 17. This ring functions in a manner similar to the ring of Fig. 1 with the addition that the breaker and bearing rings are so located relative to each other that their splits are not in alignment thus making a more nearly gas tight packing. The cup shaped depressions 18 are cut into the upper surfaces of both bearing and breaker rings.

Figure 4:
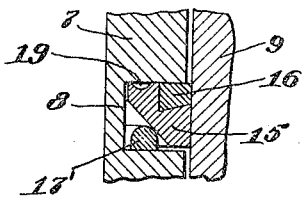
Fig. 4 is a fragmentary section showing another form of my invention applied to a three part ring.
Figure 6:
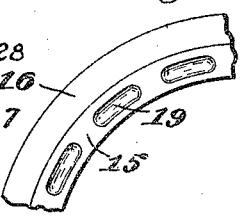
Fig. 6 is a fragmentary plan view of the ring shown in Fig. 4.

In Fig. 4 a ring similar to that of Fig. 3 is shown, the expander ring 17' being of slightly different contour. In this ring the depressions 19 are cut only into the main bearing ring, and as shown in Fig. 6 are elongated circumferentially of the ring. This form permits depressions of larger area and capacity than would be possible with round depressions in the narrow surface of ring 15.

Figure 7:
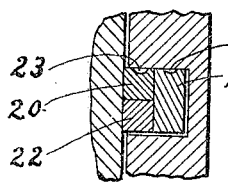
Fig. 7 is a fragmentary section showing my invention applied to another form of three part ring.

In Fig. 7 is shown a ring comprising members 20, 21 and 22 of which the members 20 and 21 are each provided with cupped depressions 23, 24 respectively. These depressions may be circular like those shown in Fig. 5 or elongated as shown in Fig. 6, or if desired the depressions in one member may be circular and in the other of elongated form.

Figure 8:
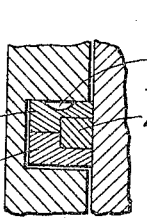

In Fig. 8 the ring comprises upper and lower bearing rings 25, 26, with the interposed ring 27, the upper ring 25 being provided with depressions 28.

Figure 9:
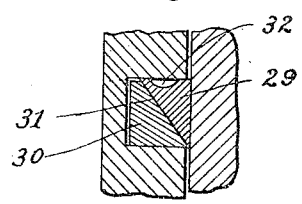
Fig. 8 is a fragmentary section showing the invention as applied to a three part ring of still another form and Fig. 9 is a fragmentary section illustrating the invention as applied to a modified form of two part ring.

In Fig. 9 is shown a two part ring consisting of the members 29, 30, which engage along the inclined surface 31. In this case the depressions 32 are carried by the ring member 29.

The surfaces between which it is important to maintain a gas-tight joint are the contacting surfaces of ring and cylinder, and the contacting surfaces of the upper side of the ring and the upper side of the groove 8. It will be understood that in practice these surfaces are coated with a film of lubricating oil. As the piston reverses its motion at the lower end of its stroke, the inertia of the ring tends to cause it to separate from the upper side of the groove 8. This tendency is overcome by the cups or depressions at the upper side of the ring, the edges of which are sealed to the upper side wall of the groove by the oil film, thus tending to create a vacuum as the ring tries to pull away from the wall of the groove. The consequent adhesion of the ring by suction if only for an instant, is sufficient to eliminate reciprocation of the ring in the groove. It also tends to counteract any tendency of the ring to creep circumferentially, which is advantageous when the cylinder walls become worn out of a true circle. Under such circumstances the piston ring should work gradually into an exact fit with the slightly distorted cylinder, which is not possible if the ring creeps circumferentially of the piston.

The suction cups similarly prevent any reciprocation of the ring at the upper or compression end of the stroke caused by the action of the explosion upon the ring through the slight clearance between the piston and the cylinder walls. The tendency of the ring to reciprocate at the upper or compression end of the stroke from this cause is less than at the lower end of the stroke, but if it occurs as is likely under high pressures the suction cups will cause the ring to adhere to the side wall of the groove.

When more than one ring is used on one piston, it is common practice to reverse the position of one of the rings, in which case the greatest tendency of one ring will be to reverse at one end of the stroke and the other ring at the other end of the stroke.

All these conditions will be taken care of by the presence of the suction cups at the side of the piston ring intended to maintain contact with the side wall of the groove.

The invention in its broad aspect is not limited to any particular form of the ring, nor to any particular form or arrangement of the depressions or suction cups.

I claim:

1. A packing for use with a piston having a circumferential groove, comprising a ring provided with spaced, cup-like depressions in its side surface whereby such ring is caused to adhere by suction to a wall of the groove.

2. A packing for use with a piston provided with a circumferential groove having imperforate side walls, comprising a ring having a series of spaced depressions in one of its side faces, said depressions being so constructed and arranged as to cause the ring to adhere to one of the side walls of the groove.

3. A composite packing adapted for use in grooves in a piston, the packing comprising a bearing ring and an expander ring urging the packing ring against one side of the groove, and means upon the side of the bearing ring which engages the side of the groove adapted to cause the packing to adhere to the side of the groove by means of suction.

4. A composite packing adapted for use in grooves in a piston, the packing comprising a metallic bearing ring and an expander ring urging the packing ring against one side of the groove and elongated cup-like depressions upon the side of the ring adapted to cause the packing to adhere to the side of the groove by means of suction.

5. A composite packing ring adapted for use in the groove of a piston, the packing comprising a pair of independent rings arranged within such groove, each of said rings being provided with a plurality of vacuum cups in a side surface thereof constructed and arranged to cooperate with the adjacent side wall of said groove, whereby to cause said rings to adhere to such wall of the groove by suction.

Signed by me at Boston, Massachusetts, this 18th day of November, 1920.

ANDREW F. HALL.